No. 876,299. PATENTED JAN. 7, 1908.
C. ONLEY.
SHOW WINDOW AND SHOW CASE CONSTRUCTION.
APPLICATION FILED OCT. 7, 1907.
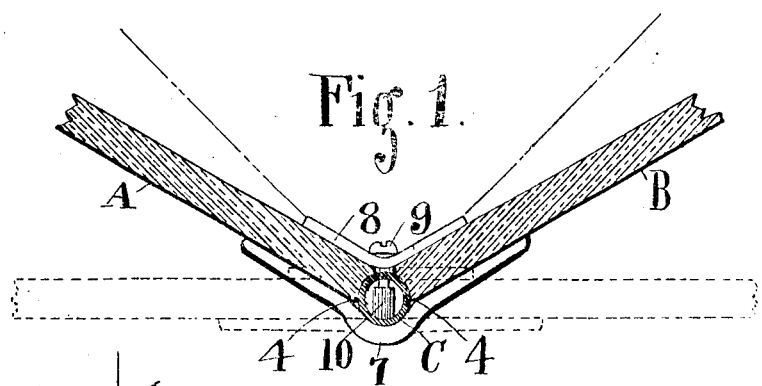
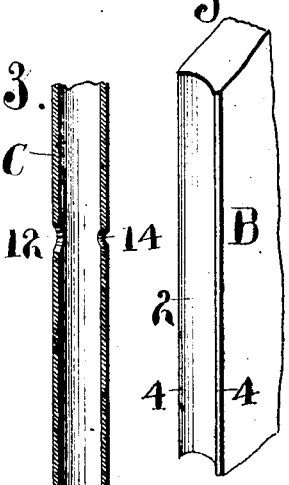
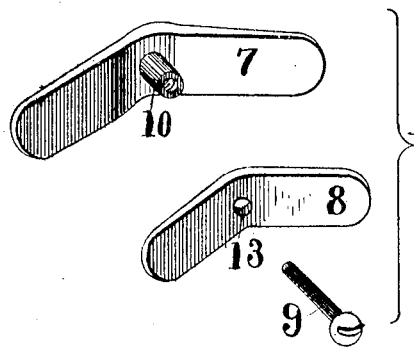
ATTEST
E. M. Fisher
F. C. [illegible]
INVENTOR
Charles M. Conley
BY Fisher & Moser ATTYS.

UNITED STATES PATENT OFFICE.

CHARLES M. CONLEY, OF CLEVELAND, OHIO, ASSIGNOR OF ONE-EIGHTH TO IRA W. PENCE AND THREE-EIGHTHS TO AMORILUS ROGERS, OF CLEVELAND, OHIO.

SHOW-WINDOW AND SHOW-CASE CONSTRUCTION.

No. 876,299.   Specification of Letters Patent.   Patented Jan. 7, 1908.

Application filed October 7, 1907. Serial No. 396,242.

*To all whom it may concern:*

Be it known that I, CHARLES M. CONLEY, a citizen of the United States, residing at Cleveland, in the county of Cuyahoga and State of Ohio, have invented certain new and useful Improvements in Show-Window and Show-Case Constructions, and do declare that the following is a full, clear, and exact description of the invention, which will enable others skilled in the art to which it appertains to make and use the same.

My invention relates to show window and show case constructions, and the object of the invention is to provide glass plates and their corner connections which are so fashioned in their manufacture as to be ready for any position or angle a given job may require, and which need not be specially adapted to each and every job in which the angles may differ more or less, all substantially as shown and described and particularly pointed out in the claims.

In the accompanying drawings, Figure 1 is a cross section of two glass plates and corner devices connecting the same and showing the plates in full lines in a certain angle, and their adaptation to other angles in dotted lines. Fig. 2 is a cross section of a set of plates and corner devices with the plates at exactly right angles to each other, but adapted to be set at other angles or positions relatively without change in the edges of the plates themselves or in the cornering member. Fig. 3 is an elevation partly in section of a portion of one of the corner supporting and connecting tubular posts shown in Figs. 1 and 2, and Fig. 4 is a perspective view of three several fastening members employed in Figs. 1 and 2 but separated here to disclose their shape and general construction. Fig. 5 shows an edge elevation of a portion of one of the glass plates.

As thus shown, the two plates of glass are represented by A and B, respectively, and for the purposes of this invention they may be regarded as in a show or display window, or in a show case, or in any other use or relation to which they may be adaptable, and the original and essential peculiarity of these plates as compared with other plates of the same general kind with which I am familiar is the construction of the engaging edges thereof, which are shown as provided with channels 2 of circular formation in cross section and running the full length of said edges, and the channels or grooves of both of said plates is exactly alike, so that said plates are interchangeable, if preferred, and are adapted to be used on the same corner member C. The said member C or post is cylindrical or tubular of suitable size or cross section according to the place of its use, the thickness of the glass and the like, and as to this it will be understood that I produce or provide different standard sizes for different uses. For example, a show case is very much smaller in size than a show window, and requires correspondingly smaller parts but the principle of construction is identical in both, and two thicknesses of glass or plates, and two different sizes relatively of corner posts and supporting bars are shown in Figs. 1 and 2. Another feature of the construction of said corners and the arrangement of parts to be especially observed is the relation which post or tube C sustains to the plates A and B. It will be seen that it is not planned to have said plates come into contact or to bear one upon the other in any direct supporting relation. Rather said plates are held apart from each other by the post against which each plate has a close fitting engagement by its channel 2, and the entire cornering is on post C. The miter beveled edges 4 contribute to this distinct separation of the plates in their angles.

Having the plates and the post as shown, they are connected and mutually supported by outer clamping members 7, inner angle members 8 and threaded locking screws 9. The said parts 7 and 8 are made of flexible metal adapted to be bent more or less and to hold the shape to which they are bent, like malleable iron, a suitable grade of brass, and the like, so that the said parts can be adapted to a given angle of the plates at the time the parts are set up and serve the same purpose as if they had been originally bent that way. Each outer clamping member is provided with an internally threaded socket 10 in the angle thereof adapted to project into tube C through a hole 12, while headed screw 9 extends through a hole 13 in angle corner piece 8 and a corresponding hole 14 in post C into said socket 10, which serves as a nut therefor. As many of these clamping or fastening devices are used as a given corner may require.

Obviously, any equivalent form or styles of clamping members for the plates and post may be adopted and be within the invention claimed. The tubular form of post is preferred because in show cases I can run electric wires through the same for corner lamps.

The bevel 4 on the edges of the plates serves to protect said edges and also contributes to cornering of the plates on the cylindrical posts with fastening devices substantially as shown.

What I claim is:—

1. In glass plate corner constructions, a cylindrical post, in combination with glass plates having channels in their edges curved in cross section to match said post and clamping devices locking said plates and post together comprising inner and outer metallic members adapted to be bent to different angles, and means to bind said devices together with said post and plates.

2. In a corner construction for show windows and cases, a cylindrical tubular post, glass plates cornering on said post having channels shaped to the outside of the said post and adapted to turn thereon to any desired angle, and clamping devices for said parts comprising an outer clamp having a threaded socket, extending into said post, an inner clamping member and a screw engaged in said socket and adapted to tighten said parts.

3. In a corner construction for show windows and the like, a tubular cylindrical post, glass plates having transversely curved channels in their edges fitting upon said posts and clamping devices to secure said plates rigidly upon said posts comprising an outer clamping member having a projection rigid therewith entering said post, and means to engage said projection and lock all said parts together.

4. In window and show case construction, a cylindrical post, in combination with glass plates having channeled edges bearing directly against said post and means to secure the parts fixedly together comprising an outer clamp having an inwardly extending projection entering said post, an inner angle member and means locking said clamp and angle member together.

5. A construction in show windows and cases comprising two glass plates arranged at an angle to each other and a corner post interposed bodily between the immediate edges of said plates and separating said edges, the said edges shaped to fit closely upon the sides of said post, in combination with inner and outer clamps for said plates, the outer clamp having a projection extending into the said post and the inner clamp locked on said projection.

In testimony whereof I sign this specification in the presence of two witnesses.

CHARLES M. CONLEY.

Witnesses:
H. T. FISHER,
F. C. NUESSEM.